United States Patent Office 2,950,707
Patented Aug. 30, 1960

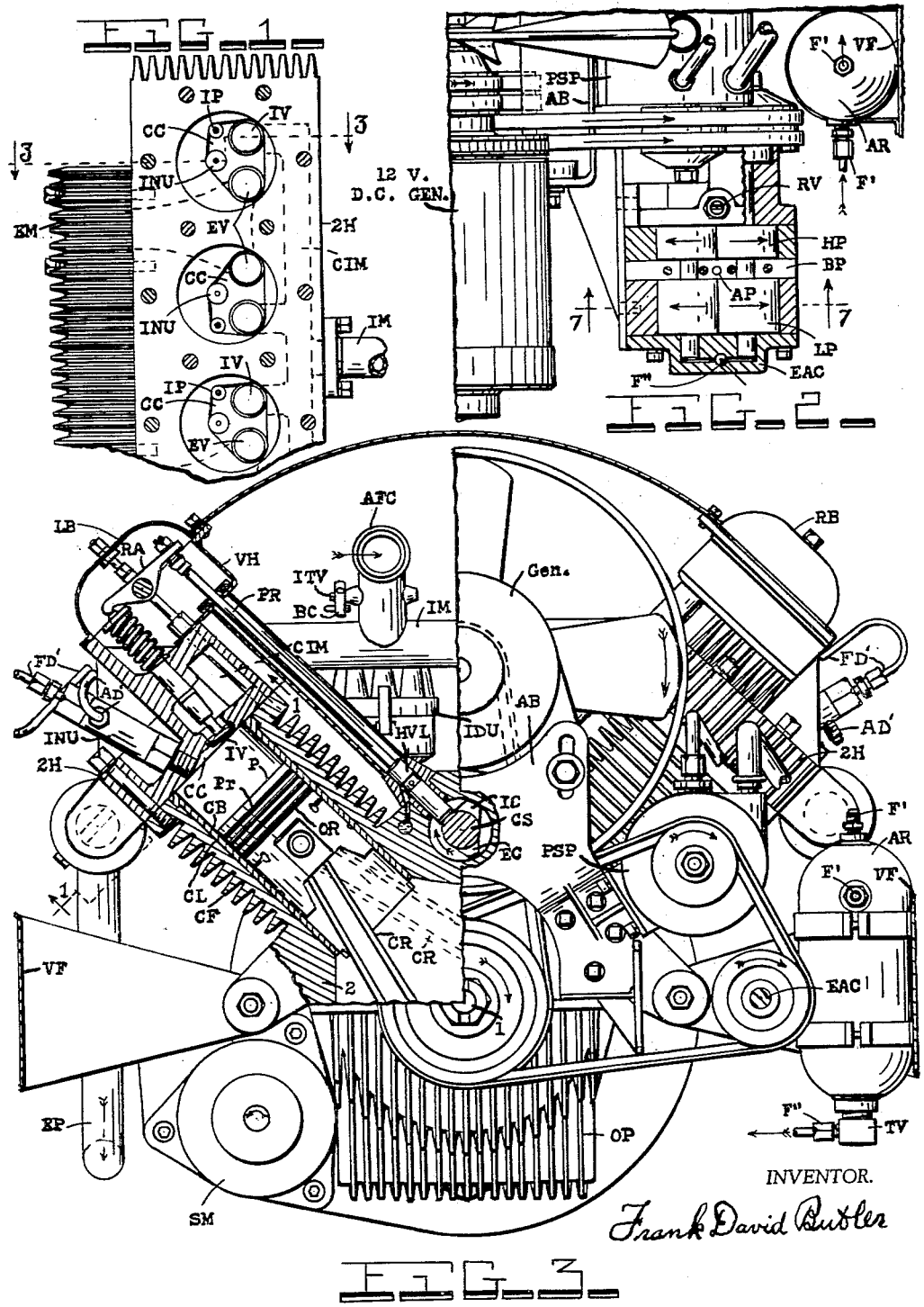

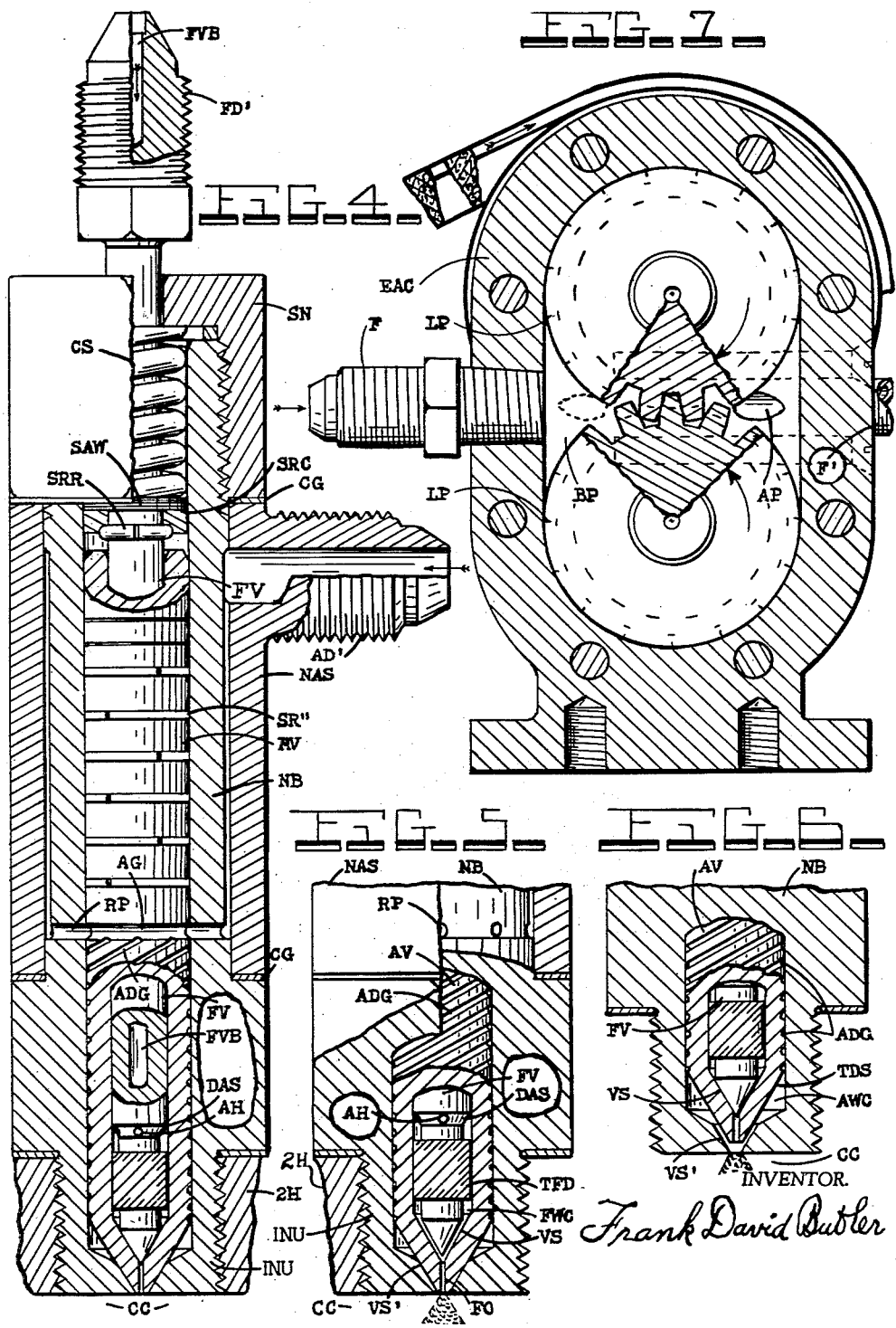

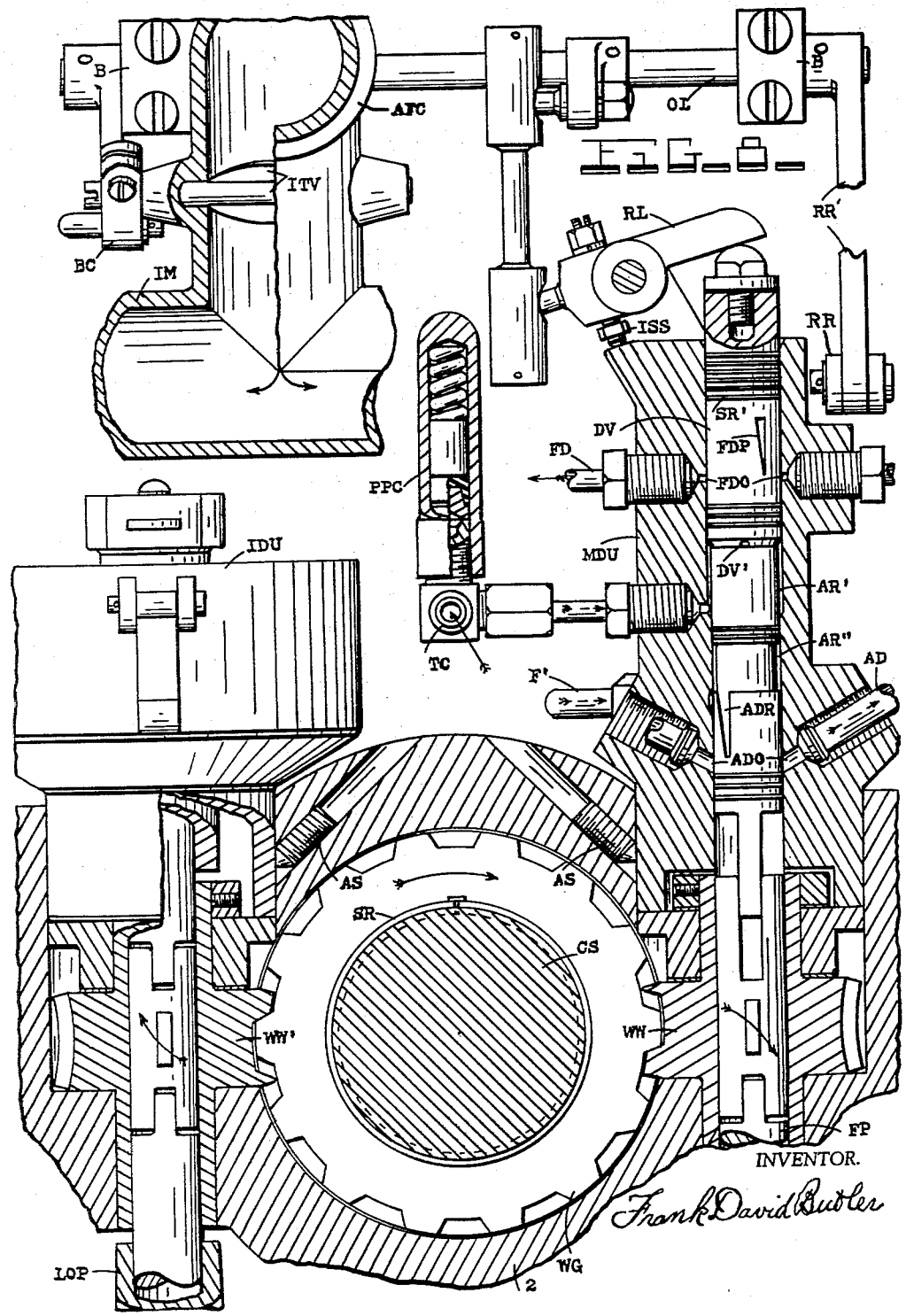

2,950,707

COMBINED LIQUID FUEL AND EXCESS AIR METERING AND DISTRIBUTING, COMBINED LIQUID FUEL AND EXCESS AIR ATOMIZING AND INJECTING, INTERNAL COMBUSTION ENGINE

Frank David Butler, 849 Dickson St., Venice, Calif.

Filed Oct. 13, 1959, Ser. No. 846,110

15 Claims. (Cl. 123—32)

While my invention relates in general to internal combustion engines, it applies more specifically to means of supplying and delivering excess air to the engine cylinders after combustion is initiated therein and prior to the exhaust of the expended products of combustion therefrom each cylinder assembly thereof such engine.

The combustion engine illustrated herein is an improvement over my economical four stroke cycle internal combustion engine patent application Serial No. 786,-216, filed January 12, 1959, wherein the major concept and improvement of my present invention has been applied to said engine and briefly includes: The provision of my multiple pressure staged compounded multiple drive and pinion geared elastic fluid compressor, as per my Patent No. 2,876,947, issued March 10, 1959, as used herein for supplying excess air under pressure via, an accumulator reservoir and my combined liquid fuel and excess air metering and distributing valve unit, to each cylinder assembly compression chamber, of the engine, through my individual, pressure activated, combined fuel atomizing and injecting and excess air diffusing and injecting nozzle valve unit of and for each such cylinder assembly. Means for rotatively driving the excess air supply compressor. Means for rotatively driving the valve proper of my combined liquid fuel and excess air metering and distributing valve unit. Means for lengthwise oscillating the valve proper of such distributing valve unit for simultaneously controlling the metered quantities of liquid fuel and excess air supplied therethrough such distributing valve unit to the individual, pressure activated, combined fuel atomizing and injecting and excess air diffusing and injecting nozzle valve unit of each cylinder assembly. Means combining all of the foregoing means in and to my four stroke economical cycle type of operating internal combustion engine for increasing its efficiency and for eliminating hydrocarbon fumes in the exhaust gas therefrom. Other minor improvements as will be described hereinafter as the specification progresses.

With reference to the accompanying drawings: Fig. 1 is a plan as on the dotted and solid line 1—1 of Fig. 3 and illustrates a portion of the left enbloc, air cooled, cylinder head of my economical cycle engine with its relatively small compression chambers, and the location of the inlet valve, exhaust valve, my combined liquid fuel and excess air injector nozzle valve unit and ignition plug therein each such chamber. Fig. 2 is a plan of a portion of the front end of Fig. 3 and illustrates the dual V belt drive and the general location of the electric generator, the cooling fan, the power steering fluid pressure pump and the excess air pressure stage compounded air compressor applied to and mounted forward of such economical cycle engine. Fig. 3 is jointly a front end elevation, and transverse section through a portion of the left enbloc, air cooled, cylinder assembly, of my economical cycle engine with a few of the improvements of my present invention applied to it. Fig. 4 is jointly an enlarged side elevation and transverse section through one of my improved unique combined, pressure activated, liquid fuel atomizer and injector, and excess air diffuser and injector nozzle valve units as applicable to each cylinder assembly of the engine. Fig. 5 illustrates a portion of one of such combined injector units with the fuel atomizer and injector valve proper thereof slightly lifted from its seat by differential, end-wise applied, liquid fuel pressure. While Fig. 6 illustrates such portion of such combined injector unit with its excess air injector valve proper slightly lifted from its seat by differential, endwise applied, excess air pressure. Fig. 7 is an enlarged transverse section through the excess air compressor, which latter is also illustrated jointly in longitudinal side elevation and section in Fig. 2. Fig. 8 is jointly an enlarged diagrammatical sketch, front elevation and transverse section of my improved unique combined liquid fuel and excess air metering and distributing control valve unit, including the camshaft drive means for rotating its distributing valve proper, and its manually operative linkage for simultaneously vertically oscillating such valve proper and the inlet air throttle-valve in the inlet manifold, and by which combined means the operation of the internal combustion engine may be completely manually remotely controlled.

With reference to the symbols of the drawings, similar symbols represent and indicate similar parts in the several figures, and wherein the symbol 1 indicates the usual engine crankshaft which latter rotates clockwise facing the front end of the engine and is journalled in the eight cylindered enbloc aluminum alloy casting 2 which latter is of the usual 90° V shaped style forming two banks of four cylinder assemblies in each bank, and known hereinafter as the right bank RB and the left bank LB, facing the front of the engine, and wherein the latter is mounted in the usual manner in an automotive vehicle framing. Each piston P is reciprocatably slidable within its respective cylinder bore CB and is connected with shaft 1 through the usual connecting rod CR, while each inlet valve IV and exhaust valve EV is retained in contact with its seat in the usual manner and is operated by its respective inlet and exhaust cam IC or EC through its respective hydraulic valve lifter HVL, adjustable push rod PR and rocker arm RA. The cylinder bores CB may be internal to the shouldered cast iron cylinder liners CL, and each piston P may be provided with two or three 1/32" wide, spring steel, chrome plated piston rings Pr in each compression ring groove, and one cast iron oil ring OR in the lower oil ring groove thereof. The cam-shaft CS is rotatively journalled in the enbloc casting 2, is rotatively driven, in the same direction of rotation as and at one-half the speed of rotation of shaft 1, through the usual silent chain and sprocket gears, located at the front end of the engine but not illustrated herein. The worm-gear WG (Fig. 8) is pressed over and keyed to rear end of CS and is retained in place axially by a pair of snap-rings SR, with one of latter on each side thereof in CS. The pair of worm-wheels WW and WW' respectively rotate anti-clockwise and clockwise as viewed from their top ends and are both rotatively journalled in casting 2 and are rotatively driven by WG. The wheel WW drives the multiple geared fuel supply and pressure pump FP, which latter is located in the air cooled engine oil pan OP, and is not illustrated in detail but may be constructed similar to my multiple geared excess air compressor EAC, and may be connected on its discharge access side via the tubing connection TC and the no surge plunger pressure chamber PPC to my combined liquid fuel and excess air metering and distributing valve unit MDU, and wherein the distributing valve proper DV of MDU is also rotatively driven by worm-wheel WW. The worm-wheel WW', in turn, rotatively drives the usual geared lubricating fluid pressure pump LOP (upper end only illustrated), which pump is also located in the oil pan OP, after the usual manner and is connected on its discharge side with the engine lubricating system via the enbloc casting 2. This wheel WW' also rotatively drives the usual combined ignition interrupter and distributor unit IDU, which latter may be of any modern adaptable type. Either unit IDU and/or MDU may be advanced and/or retarded in its timing by releasing its respective adjustment screw AS and respectively rotating IDU anti-clockwise to advance and clockwise to retard such unit, and rotating MDU vice versa to IDU for similar adjustment.

The excess air supply and pressure compressor EAC, Figs. 2 and 7, is similar to my previously mentioned Patent No. 2,876,947 and consists briefly of: a pair of relatively long 1st stage low pressure drive and driven gears LP which may be integral with their respective shafts, and a pair of relatively short 2nd stage high pressure drive and driven gears HP which may be similarly integral with their respective shafts, wherein the gears LP and HP are separated by a halved baffle partition BP which is provided with a diagonally axially extending access port AP which extends from the in-meshing sides of the gears LP to the out-meshing sides of the gears HP; an adjustable spring-loaded relief valve RV should relieve excess pressure from in-meshing sides of HP gears to out-meshing sides of LP gears; an air supply tubing fitting F should lead from an air filtering means to the out-meshing sides of gears LP; an air discharge tubing F' should lead from in-meshing sides of gears HP to the accumulator reservoir AR and thence to the combined metering and distributing valve unit MDU; the compressor may be lubricated from the engine lubricating system via the tubing connection fitting F''', and the accumulator reservoir should be provided with a trap valve TV which returns excess lubricant back to engine pan OP; a small quantity of vaporized lubricant may be carried through tubing fittings F' from reservoir AR into supply side of MDU for lubricating the valve proper DV of latter.

The combined metering and distributing control valve unit MDU consists briefly of: Diesel and/or similar liquid fuel under approximately 240 pounds pressure is supplied through the tubing connection TC, from the fuel supply and pressure pump FP, to the annular shaped recess AR', surrounding the metering and distributing valve DV, and thence passes through the series of radially extending ports DC' and bore of DV into the wedge shaped fuel metering and distributing port FDP, which latter is straight axially along its lead side so as not to change the fuel delivery timing during the vertical travel of DV. During the rotation and vertcal travel of DV, liquid fuel under pressure is measured as to quantity by the width of the tapering fuel metering and distributing port FDP plus the width of the respective fuel orifice FDO, which series of such orifices each lead, in engine firing order sequence and via a fuel delivery tubing connection FD, to its respective cylinder assembly combined fuel atomizing and injecting and excess air diffusing and injecting nozzle valve unit INU. Excess air under approximately 60 pounds pressure is supplied through the tubing connection fitting F', from the accumulator reservoir AR, to the annular shaped excess air supply recess AR'', surrounding the valve DV, which recess is in communication with the wedge shaped excess air metering and distributing recess ADR, which latter is straight axially along its lead side so as not to change the excess air delivery timing during the vertical travel of DV. During the rotation and vertical travel of valve DV, excess air under pressure is measured as to quantity by the width of the tapering recess ADR plus the width of the respective air delivery orifice ADO. The valve DV is provided with a series of 1/32" wide spring steel chrome plated seal rings SR' for preventing leakage therealong. The orifices ADO lead via the air delivery tubing connections AD to each cylinder assembly respective combined fuel atomizing and injecting and excess air diffusing and injecting nozzle valve unit INU in engine firing order sequence. As the valve DV is provided with a larger upper than lower diameter, a differential area is thereby formed by which the liquid fuel under pressure tends to force the valve DV upward towards the engine idling speed position of operation control of this valve, and forces the idling stop screw ISS, of the rocker lever RL, against its adjustable idling stop position as illustrated in Fig. 8. The usual foot accelerator pedal of the automotive vehicle is connected via the forked end reach rod RR to the operating linkage system OL, which latter is mounted on the brackets B which latter are mounted on the front side of the vehicle cowl. This linkage system OL is connected both to said rocker lever RL, for operating the valve DV, and to the bellcrank BC of the inlet air throttle-valve ITV, so that the latter and valve DV may be simultaneously moved to their full power operating travel positions by the reach rod RR and/or to their full closed engine idling positions of operation by the fuel pressure applied against the differential area of the distributing valve DV.

Whenever the metering and distributing valve unit MDU is used in conjunction with my economical cycle engine, the fuel metering and distributing port FDP and the excess air metering and distributing recess ADR should be located approximately 90° apart in the circumference of the valve DV, inasmuch as the fuel injection, in such engine, should start at the inlet valve closure timing, which closure is at 50% upward piston P travel on the compression stroke of each cylinder assembly in this type of engine, see piston P, connecting rod CR and inlet cam IC in Fig. 3. Also as it is desired to start the excess air injection after combustion has been initiated and prior to exhaust opening, at approximately 50% of the following downward power delivery stroke travel of the piston P, see dotted position CR in Fig. 3.

In order to produce greater thermal efficiency of the economical cycle of operating internal combustion engine, it is provided with a 50% piston displacement compression during the usual upward compression stroke piston travel, a compression ratio of 15 to 1, and a 100% piston displacement power delivery stroke with an expansion ratio extending from 1 to 29 volumes. By using such an extremely small compression volume and relatively high compression and expansion ratios, the combustion of the fuel mixture is more complete in such type of engine, also it offers a greater opportunity to successfully convert the modern V 8 cylinder enbloc, water cooled, internal combustion engines, as used in automotive vehicles, into air cooled engines of such type. In order to reduce the starting torque of such type of economical cycle extremely high compression ratio internal combustion engines, the cylinder assembly bores of such engine should be of less diameter than the length of the stroke thereof. For example, such economical cycle engine could be provided with 3.5 inch bore and 4 inch stroke, this would give such V 8 engine a total compression piston displacement of 154 cubical inches, and a total expansion displacement of 308 cubical inches.

Each of my pressure activated combined fuel atomizing and injecting and excess air injecting nozzle valve units INU consists briefly of: The elongated body portion NB which is threaded into one of the, air cooled aluminum alloy, enbloc cylinder heads 2H and projects into one of the cylinder assembly compression chambers CC, and is provided to slidably receive the elongated cylindrical excess air injection valve AV internally thereto and seated therein, and is provided externally thereto to rotatably receive the elongated annular shaped excess air supply adapter swivel NAS, which latter is provided with an annular shaped copper grommet CG at each end thereof and is secured in place over the upper threaded end of NB by the securing nut SN, after NB has been secured in 2H. The elongated cylindrical liquid fuel atomizing and injecting valve proper FV is a slidable fit within the excess air injection valve AV and is seated at valve seat VS within the bottom end of AV adjacent the relatively small diameter fuel orifice FO extending through the bottom end thereof from the small end of the valve seat VS. Upward from its seat VS, the valve FV is consecutively provided with, the annular shaped fuel whirling chamber FWC, the multiple threaded fuel diffuser TFD, the differential area shoulder DAS, the series of access holes AH extending through DAS into the upward extending bore FVB, the spring retainer snap-ring SRR and collar SRC, the series of spring adjustment washers SAW, the elongated coil spring CS spring loading valves FV and AV, the securing nut SN, and, the threaded fuel delivery tubing fitting FD'. Upward from its valve seat VS', in lower end of NB, the excess air injector valve AV is consecutively provided externally with, the air whirling chamber AWC, the tapering differential area shoulder TDS, the series of symmetrically spaced, helically extending, air diffuser grooves ADG, the annular shaped access groove AG in communication with the series of radially extending ports RP in NB, and the series of $\frac{1}{32}''$ wide chrome plated snap-type seal rings SR'', and, wherein the outer ends of the ports RP are in communication with the excess air delivery fitting AD' of NAS. In regards to the operation of the injection nozzle valve unit INU, as both the fuel injection valve FV and excess air injection valve AV thereof are both activated by pressure against their respective differential area shoulders DAS and TDS and are both resisted in such pressure activation by the same load spring CS, and as TDS is approximately four times the differential area of DAS, the required activating pressure on latter may be 240 pounds, while the required activating pressure on TDS may be 60 pounds. With reference to Figs. 3, 4, 5, 6 and 8, during the supply of timed metered fuel under pressure from MDU to the respective valve FV through fitting FD', after the closure of the inlet valve IV and prior to the usual ignition advance period of the respective cylinder assembly, such fuel under pressure adjacent DAS activates valve FV upward slightly away from its seat VS, as in Fig. 5. Such fuel adjacent DAS is then injected past fuel diffuser TFD, through the whirling chamber FWC thence between valve FV and its seat VS and on through orifice FO into the adjacent compression chamber CC in a minutely atomized whirling spray mist, which latter is then ignited by the adjacent ignition plug IP, and combustion of the fuel mixture is thereby initiated in such combustion chamber CC as piston P of such cylinder assembly continues upward towards the end of its normal compression stroke. During the period that the proper proportion of air and atomized fuel burn, combustion products are formed within such cylinder assembly. When the piston P thereof reaches approximately 50% of its downward succeeding power delivery stroke, predetermined timed metered excess air under pressure, supplied through fitting AD', of the nozzle adapter swivel NAS, from MDU to adjacent the tapering differential area shoulder TDS of excess air diffuser and injector valve AV, activates latter upward slightly away from its seat VS', as in Fig. 6, and such excess air is then injected from the lower ends of the helically extending air diffusing grooves ADG thence through the air whirling chamber AWC and between the valve AV and its seat VS' into the adjacent CC as a diffused whirling mass, wherein such CC such excess air supplies the necessary excess oxygen to completely burn any hydro-carbon remaining in the product of combustion therein, and thereby resulting in a final exhaust therefrom in the form of carbon dioxide in lieu of the usual carbon monoxide gas, so therefore free of gas fumes that normally produce smog in congested automotive vehicle areas.

As practically all V 8 cylindered, water cooled, internal combustion engines as used in our present day automotive vehicles as the motive power means thereof, use a highly volatile fuel and produce approximately 40% more horse power than is normally required therein, and could be replaced by my V 8 cylindered, air cooled economical four stroke cycle type of internal combustion engine that uses an extremely low volatile fuel, and further uses only 50% of its full piston displacement volumetric capacity charge during each compression stroke, and also uses an extremely high compression ratio of 15 to 1, and still higher 100% piston displacement power expansion ratio of 29 to 1, there is no question as to which of the two types of internal combustion engines would be the best to apply my combined liquid fuel and excess air timed metering and distributing valve, and combined liquid fuel atomizing and injecting and excess air diffusing and injecting nozzle valves in order to realize the highest thermal efficiency and in which to simultaneously eliminate carbon monoxide smog in the exhaust therefrom.

With reference to miscellaneous detail: The valve ITV should be located closely adjacent an air filter connection AFC in inlet manifold IM and latter should extend to adjacent the cored inlet manifolds CIM in enbloc heads 2H. The reach rod RR should be connected to linkage OL by a relatively long crank arm RR'. The plunger pressure chamber PPC should be located closely adjacent MDU so as to reduce liquid fuel pressure fluctuation surge within latter. As the economical cycle engine has an expansion ratio of 29 to 1, no muffler is required and exhaust pipes EP are connected direct to exhaust manifolds EM. The shaft of the electrical starting motor SM rotates opposite to crankshaft 1. As the engine is air cooled, no radiator is required, the 12 volt D.C. electrical generator 12 V.D.C. Gen., the excess air compressor EAC and the power steering pump PSP may all be mounted on the angle bracket AB extending out in front of engine, while the excess air reservoir AR may be secured to the vehicle frame VF. My combined liquid fuel and excess air injector nozzles INU reduce the number of required openings in each relatively small CC to a minimum, see Fig. 1. Also by combining the liquid fuel and excess air metering and distributing means MDU, and with valve ITV oscillating means, the engine and excess air control means is simplified. Any type of efficient excess air compressor EAC may be used as long as the metered excess air to nozzles INU is free of oil. While my invention is illustrated for thermally efficient purposes as applicable to the four stroke economical cycle type of operating internal combustion engine, it is also applicable to the common two stroke cycle type of operating internal combustion engines.

With the foregoing objects in view, and having fully described my invention in its best method of adaptation use in such economical cycle internal combustion engine of and for an automotive vehicle.

I claim:

1. In a multiple cylindered four stroke reciprocating piston economical cycle type of operating internal combustion engine having a cam-shaft rotated at one-half the speed of and by a rotatable crankshaft of such engine and wherein each cylinder assembly is equipped with a combined compression and combustion chamber having an inlet air valve and, together and externally thereto, having a throttle valve for controlling the air supply thereto, the provision therein and therewith of: a multiple of elongated, pressure activated, combined metered fuel atomizing and injecting and metered excess air diffusing and injecting nozzle valves, with one provided secured to each cylinder assembly and projecting at such end into the adjacent compression chamber of such respective cylinder, and provided at its opposite end with a means of supply of timed metered liquid fuel under pressure, and provided adjacent an intermediate swivel portion thereof with a means of supply of timed metered excess air under pressure, and, wherein each such nozzle valve is provided, during the compression cycle of operation after inlet valve closure, for atomizing and injecting a metered quantity of liquid fuel into its respective cylinder compression chamber in proportion to the quantity of air admitted thereto via its respective inlet valve and as controlled by said throttle valve, and provided further, during the power delivery cycle of operation, after combustion has been initiated within its respective cylinder chamber, for diffusing and injecting a metered quantity of air into the latter, in excess of the normal amount required for combustion, and for burning hydro-carbon remaining therein to carbon dioxide gas so as to eliminate carbon monoxide fumes during the normal exhaust from such respective chamber; an elongated combined fuel and excess air metering and distributing valve, rotatable by said camshaft and oscillatable lengthwise; a manually operative means for simultaneously controlling the oscillation of said combined fuel and excess air metering and distributing valve and said throttle valve, for engine control purposes; and, means of supplying liquid fuel and excess air under pressure to said combined fuel and excess air metering and distributing valve.

2. In a four stroke reciprocating piston economical cycle type of operating internal combustion engine equipped with a cylinder, a combined compression and combustion chamber within such cylinder, a rotatable crankshaft for reciprocating said piston in said cylinder and for rotatively driving an elongated camshaft at one-half its speed of rotation, an air inlet valve for admitting air to within said compression chamber, a throttle-valve for controlling such air to such inlet valve, means for igniting fuel mixture within said compression chamber, an exhaust valve through which to exhaust spent gas from said combined compression and combustion chamber, means operated by said camshaft for operating said inlet and exhaust valves and, a fuel supply and pressure pump, the provision therein and therewith of: an elongated combined pressure activated metered fuel atomizing and injecting nozzle valve within an elongated combined, pressure activated, metered excess air diffusing and injecting nozzle valve, wherein the former is for injecting metered atomized fuel within said compression chamber in correct proportion to the quantity of air admitted thereto for fuel mixture combustion purposes therein, while the latter is for injecting metered diffused compressed air into said compression chamber, after combustion has been initiated therein, and for burning any remaining hydro-carbon therein to carbon dioxide gas for preventing smog in the exhaust fumes from such engine; an elongated combined fuel and excess air metering and distributing valve rotatable by said camshaft and oscillatable lengthwise; a manually operative means for simultaneously controlling the oscillation of said combined fuel and excess air metering and distributing valve and said throttle valve, and thereby controlling the operation of the engine; means operative by said crankshaft for compressing excess air as joined with means for supplying such compressed air through an accumulator reservoir to the combined metering and distributing valve; means for supplying liquid fuel under pressure to said combined metering and distributing valve; and, means for delivering metered fuel and metered excess air from the distributing valve to the injection nozzle valve.

3. In a reciprocating piston type of internal combustion engine having a combined compression and combustion chamber with an air inlet valve, an exhaust outlet valve and a fuel mixture ignition plug therein, and having a rotatable camshaft rotated at one-half the speed of and by a rotatable crankshaft of such engine, the provision therein and therewith of: an elongated, pressure activated, combined metered fuel atomizing and injecting and metered excess air diffusing and injecting nozzle valve, provided with means of supply of metered liquid fuel under pressure at one end, a means of supply of metered excess air under pressure adjacent an intermediate portion thereof, and provided to terminate within said compression chamber at the opposite end thereof, and, provided for atomizing and injecting metered fuel to within such compression chamber after the closure of said air inlet valve thereof, and also for diffusing and injecting metered excess air to within such compression and combustion chamber after combustion of such metered fuel has been initiated by said ignition plug therein; an elongated combined fuel and excess air metering and distributing valve rotatable by said camshaft and oscillatable lengthwise; a manually operative means for remotely simultaneously controlling the oscillation of said combined fuel and excess air metering and distributing valve and a throttle valve through which to supply air to said air inlet valve, and thereby controlling the operation of said engine; means operative by said crankshaft for compressing excess air and provided with means for supplying such compressed air through an accumulator reservoir to the combined metering and distributing valve; means for supplying liquid fuel under pressure from a fuel supply and pressure pump to said combined metering and distributing valve; and, means for delivering metered liquid fuel under pressure, and metered excess air under pressure from the combined metering and distributing valve to the combined metered fuel atomizing and injecting and metered excess air diffusing and injecting nozzle valve.

4. The internal combustion engine of claim 1 characterized by; said elongated combined fuel and excess air metering and distributing valve rotatable by said camshaft and oscillatable lengthwise, to consist of: an elongated vertically extending cylindrical body portion provided with a stepped diameter concentric cylinder bore, with its larger diameter bore extending upward and its smaller diameter bore extending downward from its intermediate length, and provided to be rotatably adjustable adjacent its lower end in a vertical bore, of an enbloc casting of the engine, adjacent said camshaft, and provided with a forked portion at its opposite end with an elongated rocker lever pivoted therein; an elongated cylindrical stepped diameter combined liquid fuel and excess air metering and distributing valve proper provided rotatable and oscillatably slidable vertically within said stepped diameter bore and provided at its lower end with an elongated tongued shaped driving means, and at its upper end with a threaded crowned cap-screw for closing a fuel access bore therein and contactable by one end of said rocker lever, and provided in its upper intermediate portion with a wedge shaped fuel metering and distributing valve port, which latter is straight vertically along its lead side and is in communication, via said access bore, with a means of supply of liquid fuel under pressure, and is intermittently communicative with a series of radially extending fuel delivery orifices, which latter are symmetrically spaced in the periphery of the larger diameter stepped bore of said body portion and are each in communication with an individual fuel delivery tubing fitting in such body portion, and which valve proper is provided externally in its lower intermediate portion with a similar wedge shaped excess air metering and distributing valve recess, which latter is straight along its lead side and is in communication at its top end with a means of supply of compressed excess air under pressure, and is intermittently communicative with a series of radially extending excess air delivery orifices, which latter are symmetrically spaced in the periphery of the smaller diameter stepped bore of said body portion and are each in communication with an individual excess air delivery tubing fitting in such body portion, wherein said valve proper is also provided externally with an elongated annular shaped air supply recess, adjacent the top end of said air distributing recess and an excess air supply access in said body portion, and is provided further with a liquid fuel supply access adjacent the bottom of the larger diameter bore in said body portion and in communication, via a series of radially extending fuel access ports, with said fuel access bore, and is also provided, distributed along its outer surface, with a multiple of series of snap-type seal rings; and, wherein said valve proper is provided to be oscillated upward, towards the engine idling position of its control, by liquid fuel under pressure adjacent the lower side of its stepped diameter, and is provided to be oscillated downward, towards the engine full power operation of its control, by manual operation of said rocker lever, for controlling metered fuel and excess air distribution, in a predetermined timing delivery, to the combined fuel atomizing and injecting and excess air diffusing and injecting nozzle valves of, and in the firing order sequence of, the individual cylinder assemblies of the engine.

5. The internal combustion engine of claim 1 characterised by; wherein said manually operative means for simultaneously controlling the oscillation of said combined fuel and excess air metering and distributing valve and said throttle valve, for engine control purposes, to consist of: an operative linkage means supported upon a front side of the usual cowl of an automotive vehicle and oscillatably operative through a reach-rod connected to the usual foot accelerator of such vehicle; means connecting said throttle valve, and a rocker lever, pivoted in a forked upper end of a body portion of the distributing valve proper, to said linkage so that both said throttle valve and rocker lever may simultaneously be oscillated through their full travel; and, means operative by liquid fuel under pressure against a stepped diameter of said valve proper, for oscillating latter upward towards its engine idling position of travel and simultaneously closing said throttle valve through said rocker lever and the means connecting both to said linkage.

6. The internal combustion engine of claim 1 characterised by; each of said nozzle valves to consist of: an elongated combined cylindrical and hexagon, body portion, which is threaded, at its projecting end, into a cylinder head of the respective cylinder assembly and is exposed to the compression chamber of latter, and is provided with a concentric bore extending from its outer end to a tapering seat adjacent its inner end, which seat terminates in the latter, and is provided, over an elongated cylindrical shouldered external portion, adjacent a hexagon portion thereof, to rotatively receive an elongated annular shaped adapter swivel, which latter is provided with a tubing connection fitting, on one side of its outer end, having access with a source of supply of predetermined timed metered excess air under pressure, and is secured against said shoulder by an elongated nut, which latter is threaded over the outer end of said body portion; an elongated cylindrical excess air diffusing and injecting valve proper, slidable within said body portion bore and taper seated at its inner end therein and exposed slightly to said compression chamber, and provided outward adjacent such seat externally consecutively with, a tapering annular shaped air whirling chamber, a tapering differential area shoulder, a series of helically outward extending air diffusing grooves, an annular shaped access groove having communication through access means with said tubing fitting, and thence outward to its end with a series of symmetrically spaced snap-type seal rings, and, is provided internally with a concentric bore extending from its outer to adjacent a conical seat adjacent its inner end, which conical seat terminates at its inner end in a relatively small elongated concentric orifice which terminates at the inner end of such air injecting valve proper; an elongated, combined cylindrical and hexagon, metered fuel atomizing and injecting valve proper, slidable within said bore of said air injecting valve proper and conically seated adjacent said orifice therein, and provided externally therein outward from this seat consecutively with, an annular conically shaped fuel whirling chamber, a multiple threaded fuel diffusing means, a conical differential area shoulder, and, access means extending from latter to outer end of this valve proper; outward from the outer end of the air injection valve proper, the fuel injection valve proper is provided externally consecutively with, a coil spring snap-type retainer ring, an annular shaped retainer collar surrounding this ring, a series of spring adjustment washers, an elongated coil-type load spring for retaining both valves proper in contact with their respective seats, said securing nut of said swivel, and an integral, combined cylindrical and hexagon tubing connection fitting having access with a source of supply of, predetermined timed metered, liquid fuel under pressure; and, wherein said fuel atomizing and injecting valve proper is activated slightly outward by latter applied at its respective differential area shoulder, and, wherein said excess air diffusing and injecting valve proper is activated slightly outward by said predetermined timed excess air under pressure applied at its respective differential area shoulder in the operation of such combined nozzle valves.

7. In a multiple cylindered reciprocating piston type of internal combustion engine having a combined compression and combustion chamber within each cylinder assembly, each having an air inlet valve, an ignition plug and an exhaust outlet valve therein, and, having a camshaft operated by a crankshaft of such engine, the provision therein of: a multiple of elongated, pressure activated, combined, timed metered liquid fuel under pressure atomizing and injecting and timed metered excess air under pressure diffusing and injecting, nozzle valves, with one of latter provided for each cylinder assembly and exposed at an inward end thereof to the respective adjacent compression chamber; an elongated combined liquid fuel and excess air timed metering and distributing valve, rotatable by said camshaft and oscillatable lengthwise; means for supplying liquid fuel and excess air, both under pressure, to such combined distributing valve; means for delivering timed metered liquid fuel and excess air, both under pressure, to each of the nozzle valves; and, means for simultaneously manually oscillating a valve proper, of said metering and distributing valve, and a throttle valve, through which air is supplied to each cylinder assembly, for purposes of controlling the operation of the engine, and for supplying metered excess air to the cylinder assemblies of latter.

8. In a reciprocating piston type of internal combustion engine having a combined compression and combustion chamber equipped with, an air inlet valve, an ignition plug and an exhaust outlet valve therein, and, having a camshaft operative by a crankshaft of such engine, the provision therein of: an elongated, pressure activated, combined, timed metered liquid fuel under pressure atomizing and injecting and timed metered excess air under pressure diffusing and injecting, nozzle valve, exposed at an inward end thereof to said compression chamber, and having access at the opposite end thereof with a source of supply of timed metered liquid fuel under pressure, and having access at a swivel intermediate portion thereof with a source of supply of timed metered excess air under pressure; an elongated combined liquid fuel and excess air timed metering and distributing valve, rotatable by said camshaft and oscillatable lengthwise; means for supplying liquid fuel and excess air, both under pressure, to such combined distributing valve; means for delivering timed metered liquid fuel and excess air, both under pressure, from said combined distributing valve to the respective fuel and air supply sides of said nozzle valve; and, means for simultaneously manually oscillating a valve proper, of said metering and distributing valve, and a throttle valve, through which air is supplied through said air inlet valve to said compression chamber, for purposes of manually controlling the operation of the engine.

9. In a rotary shaft internal combustion engine having at least one combustion chamber equipped with an inlet supply means, an ignition plug and an exhaust outlet means, the provision therein of: an elongated, pressure activated, timed metered fuel atomizing and injecting and timed metered excess air diffusing and injecting nozzle valve, secured adjacent and exposed at one end to said combustion chamber and provided at its opposite end with a source of supply of timed metered liquid fuel under pressure, and, provided adjacent an intermediate swivel portion thereof with a source of supply of timed excess air under pressure; and, wherein such combined nozzle valve injects, atomized liquid fuel into said combustion chamber during a supply period, and diffused excess air thereinto during a power period of operation of such engine.

10. In a multiple cylindered reciprocating piston four stroke cycle type of operating internal combustion engine having a rotatable crankshaft rotating a camshaft at one-half its speed, and wherein each cylinder assembly has a combustion chamber equipped with an inlet supply valve, an ignition plug and an outlet exhaust valve, the provision therein of: a multiple of elongated pressure activated combined timed metered fuel under pressure atomizing and injecting, and timed metered excess air under pressure diffusing and injecting nozzle valve units, with one each of latter provided secured adjacent and exposed at one end thereof to one of each of the combustion chambers, and provided adjacent its opposite end with a timed supply of metered liquid fuel under pressure, and provided adjacent an intermediate swivel portion thereof with a timed supply of metered excess air under pressure, and provided internally with an elongated cylindrical, lengthwise activated, combined excess air diffusing and injecting valve proper, which latter is provided internally with an elongated cylindrical, lengthwise activated, combined liquid fuel atomizing and injecting valve proper, wherein both valves proper are seated towards the adjacent combustion chamber and are both spring loaded with the same coil-type resilient spring; an elongated, annular shaped, rotatable adjustable, combined liquid fuel and excess air metering and distributing valve unit provided with a concentric stepped diameter bore with the larger diameter extending upward and provided with a means of supply of liquid fuel under pressure adjacent the step, and provided symmetrically spaced in its upper intermediate portion with a metered fuel outlet access to each of the nozzle valve units, and provided adjacent below the step with a means of supply of excess air under pressure, and provided symmetrically spaced in its lower intermediate portion with a metered excess air outlet access to each of said nozzle valve units; an elongated stepped diameter combined liquid fuel and excess air metering and distributing valve proper, oscillatable lengthwise in, and rotatable by said camshaft in said stepped diameter bore, and provided in its upper portion with a wedge shaped fuel metering and distributing port, and provided in its lower portion with a similar wedge shaped excess air metering and distributing recess; means for simultaneously manually oscillating said metering and distributing valve proper and a throttle valve controlling an inlet manifold supply to the inlet valves, for purposes of simultaneously controlling the operation of the engine and the supply of metered excess air thereto; and, wherein said fuel atomizing and injecting valve proper is pressure activated during the compression stroke, while said excess air diffusing and injecting valve proper is activated during the power delivery stroke of the respective cylinder assembly, so that the metered excess air will be supplied to latter after combustion therein has been initiated so that remaining hydro-carbons therein will be burned to carbon dioxide, in lieu of carbon monoxide gas, so as to prevent smog-fumes in the normal exhaust from such type of engines.

11. In a reciprocating piston type of internal combustion engine having at least one cylinder assembly having a combined compression and combustion chamber equipped with, an inlet supply valve, an ignition plug and an exhaust outlet valve, and, an externally located oscillatable throttle valve for controlling the inlet supply, the provision therein of: an elongated pressure activated combined timed metered excess air under pressure diffusing and injecting nozzle valve secured adjacent and exposed at one end to said chamber, and provided adjacent its opposite end with a timed supply of metered excess air under pressure; an elongated combined excess air metering and distributing valve rotatable by a camshaft, and oscillatable lengthwise and provided with a wedge shaped combined metering and distributing recess; means for supplying excess air under pressure to such distributing valve; means for simultaneously oscillating said distributing valve and said throttle valve; and, means of delivery of timed metered excess air under pressure from such distributing valve to said nozzle valve during a power stroke of said reciprocating piston, and, for the purpose of burning any hydrocarbon in said chamber, during such power stroke, to carbon dioxide and thereby eliminating any carbon monoxide fumes in the exhaust outlet.

12. In a multiple cylindered reciprocating piston type of internal combustion engine having each cylinder assembly thereof provided with a combined compression and combustion chamber each equipped with, an inlet supply means, an ignition plug, and, an exhaust outlet means, and wherein said inlet supply means is controlled by an oscillatable throttle valve, and the pistons are reciprocatable by a rotatable crankshaft, the provision therein of: an elongated combined liquid fuel and excess air metering and distributing valve which is rotatable indirectly by said crankshaft and is oscillatably slidable lengthwise, and is provided with a wedge shaped, liquid fuel, timed metering and distributing valve port, and a similar wedge shaped, excess air, timed metering and distributing valve recess; a multiple of elongated, pressure activated, combined liquid fuel atomizing and injecting and excess air diffusing and injecting nozzle valves, with one of latter secured adjacent and exposed at one end thereof to one each of said chambers, and each provided at its opposite end with a source of supply of timed metered liquid fuel under pressure, and provided adjacent an outer end of an elongated intermediate swivel portion thereof with a source of supply of timed metered excess air under pressure; means for supplying both liquid fuel and excess air under pressure to said distributing valve; means for distributing timed metered liquid fuel and timed metered excess air both under pressure from said distributing valve to each of said nozzle valves in the normal firing order sequence of the engine; means for simultaneously oscillating said distributing valve and said throttle valve for controlling the operation of the engine and for simultaneously controlling the timed metering and distributing of said liquid fuel and excess air under pressure from said distributing valve to said nozzle valves; and, wherein metered liquid fuel under pressure is distributed in firing order sequence from said distributing valve to the nozzle valve of each cylinder assembly respectively in such sequence but during a portion of the compression period of normal operation of such assembly, while metered excess air under pressure is distributed to each such nozzle valve during the normal power delivery period of operation of such respective cylinder assembly.

13. In a multiple cylindered, rotatable crankshaft reciprocating piston type of operating internal combustion engine having each cylinder assembly thereof equipped with a combined compression and combustion chamber each having, an inlet supply means, an ignition plug and an exhaust outlet means, and wherein an externally located oscillatable throttle valve controls all such inlet supply means, the combination therein and therewith of: an elongated, annular shaped, stepped diameter bore, rotatably adjustable, combined liquid fuel and excess air metering and distributing valve unit provided with an elongated, cylindrical, stepped diameter, combined liquid fuel and excess air metering and distributing valve proper, which latter is oscillatably slidable lengthwise, and is rotatable indirectly by said crankshaft, within said stepped diameter bore and is provided with an elongated wedge shaped combined fuel metering and distributing valve port and a similar elongated wedge shaped excess air metering and distributing valve recess, each of which latter and valve port are intermittently cooperative with a series of elongated distributing orifices symmetrically spaced and extending, from adjacent said valve proper, radially in said valve unit with one of each connected via a tubing access means to a combined fuel and excess air injection nozzle valve unit of each cylinder assembly; means for supplying liquid fuel and excess air, both under pressure, through said distributing valve unit to adjacent said valve proper thereof; means for simultaneously manually oscillating both said throttle valve and said valve proper for controlling the engine and the metered quantities of excess air distributed thereto; a multiple of elongated, annular shaped, combined metered liquid fuel pressure atomizing and injecting and metered excess air diffusing and injecting nozzle valve units with one each threaded into each cylinder assembly, and exposed at a downward inward end thereof to the respective compression chamber of the respective cylinder assembly, and provided surrounding its intermediate length with an elongated annular shaped swivel portion, which latter is provided adjacent its outer end with a tubing access means of metered excess air supply from said distributing valve unit; a multiple of elongated, cylindrical combined metered excess air diffusing and injecting valves proper, each slidably pressure activated lengthwise in and seated towards the inward end of its respective nozzle valve unit within a bore of latter and having access with said metered excess air supply of said swivel of such respective nozzle valve unit; a multiple of elongated, cylindrical combined metered liquid fuel atomizing and injecting valves proper, each slidably pressure activated lengthwise in and seated towards the inward end of a bore within its respective air injecting valve proper of its respective nozzle valve unit and provided with a tubing connection means, at its outward end, of supply of metered liquid fuel under pressure from said distributing valve unit; a single elongated coil spring for simultaneously retaining each paired fuel injecting and air injecting valve proper in contact with its respective seat; means of predetermining the timing of said combined liquid fuel and excess air metering and distributing valve proper in relation to the rotation of said crankshaft so that each respective fuel atomizing and injecting valve proper of each nozzle valve unit of each respective cylinder assembly will be pressure activated away from its seat during a predetermined portion of the normal compression period of operation of its respective cylinder assembly, and that each excess air diffusing and injecting valve proper of each respective nozzle valve unit of each respective cylinder assembly will be pressure activated away from its seat during a predetermined portion of the normal power delivery operation of its respective cylinder assembly; and, wherein such combined type of excess air metering and distributing, and combined type of excess air diffusing and injecting means will normally burn all hydrocarbon in each respective cylinder assembly to carbon dioxide gas, due to metered excess quantity of air added thereto, and thereby will result in eliminating exhaust gas smog fumes from such type of engines.

14. In a rotatable crankshaft reciprocating piston type of operating internal combustion engine having at least one cylinder assembly equipped with a combined compression and combustion chamber having, an inlet supply means, an ignition plug and an exhaust outlet means therein, and wherein an externally located oscillatable throttle valve controls the inlet supply means, the combination therein and therewith of: an elongated, annular shaped, stepped diameter bore, rotatably adjustable, combined liquid fuel and excess air metering and distributing valve unit provided with an elongated, cylindrical, stepped diameter, combined liqued fuel and excess air metering and distributing valve proper, which latter is oscillatably slidable lengthwise, and is rotatable indirectly by said crankshaft, within said stepped diameter bore and is provided with an elongated wedge shaped combined fuel metering and distributing valve port and a similar elongated wedge shaped combined excess air metering and distributing valve recess; means for supplying liquid fuel and excess air, both under pressure, to adjacent said valve proper; an elongated, annular shaped, combined metered liquid fuel pressure atomizing and injecting and metered excess air diffusing and injecting nozzle valve unit threaded at a downward inward end thereof into said cylinder assembly and exposed to said chamber thereof, and provided surrounding its intermediate length with an elongated annular shaped swivel portion, which latter is provided adjacent its upper end with a tubing access means of metered excess air supply from said distributing valve unit; an elongated, cylindrical, combined metered excess air diffusing and injecting valve proper, slidably pressure activated lengthwise in and seated towards the inward end of its respective nozzle valve unit within a bore of latter and having access with said metered excess air supply of said swivel portion; an elongated, cylindrical, combined metered liquid fuel atomizing and injecting valve proper, slidably pressure activated lengthwise in and seated towards the inward end of a bore within said excess air injecting valve proper and provided with a tubing connection means, at its outward end, of supply of metered liquid fuel under pressure from said distributing valve unit; a single elongated coil spring for simultaneously retaining said excess air injecting valve and said liquid fuel injecting valve in contact with their respective seats; and, means for simultaneously manually oscillating both said distributing valve proper and said throttle valve, for controlling the engine and the distribution of metered excess air to the combustion chamber thereof.

15. In a multiple cylindered four stroke reciprocating piston economical cycle type of operating internal combustion engine having a camshaft rotated at one-half the speed of and by a rotatable crankshaft of such engine and wherein each cylinder assembly is equipped with a combined compression and combustion chamber having, an inlet supply means, an ignition plug and an exhaust outlet means therein, and wherein an externally located oscillatable throttle valve meter controls the inlet supply means, the combination therein and therewith of: a multiple of elongated, pressure activated, combined metered excess air diffusing and injecting nozzle valves, with one provided secured to each cylinder assembly and projecting at such end into the adjacent compression chamber of such respective cylinder, and provided adjacent thereto with a swivel portion secured thereover and provided with means of supply of timed metered excess air under pressure, and, wherein each nozzle valve is provided, during the power delivery cycle of operations, after combustion has been initiated, within the respective cylinder chamber, for diffusing and injecting a metered quantity of excess air into latter for burning hydro-carbons remaining therein to carbon dioxide gas so as to eliminate carbon monoxide fumes during the normal exhaust from such respective cylinder chamber; an elongated combined excess air metering and distributing valve rotatable by said camshaft and oscillatable lengthwise; a manually operative means for simultaneously controlling the oscillation of said distributing valve and said throttle valve for controlling the operations of the engine; means operative by said crankshaft for compressing excess air as joined with means for supplying such compressed air through an accumulator reservoir to the combined excess air metering and distributing valve; means for supplying metered atomized fuel under pressure to each cylinder assembly; means for compressing the fuel mixture in each compression chamber to a 50% piston displacement 15 to 1 compression ratio, and for expanding the products of combustion to an expansion ratio of 29 to 1 during the succeeding 100% piston displacement power delivery stroke of each respective piston; and, means for burning a low volatile fuel in such engine.

References Cited in the file of this patent

UNITED STATES PATENTS 2,568,473     Tucker _____ Sept. 18, 1951